United States Patent
Choi (10) Patent No.: US 8,898,266 B2
(45) Date of Patent: Nov. 25, 2014

(54) APPARATUS AND METHOD FOR SETTING ROLE BASED ON CAPABILITY OF TERMINAL

(75) Inventor: Hye-Eun Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 12/204,177

(22) Filed: Sep. 4, 2008

(65) Prior Publication Data

US 2009/0138584 A1 May 28, 2009

(30) Foreign Application Priority Data

Nov. 23, 2007 (KR) .................. 10-2007-0120412

(51) Int. Cl.
*G06F 15/16* (2006.01)
*H04L 29/08* (2006.01)
(52) U.S. Cl.
CPC ............ *H04L 67/104* (2013.01); *H04L 67/303* (2013.01); *H04L 67/1051* (2013.01); *H04L 67/1093* (2013.01)
USPC .......................... 709/223; 370/395.2; 709/224
(58) Field of Classification Search
CPC .................................................... H04L 67/104
USPC ........................................................ 709/223
See application file for complete search history.

(56) References Cited

U.S. PATENT DOCUMENTS

| | | | |
|---|---|---|---|
| 6,704,584 B2 | 3/2004 | Litwin | |
| 6,894,992 B1 * | 5/2005 | Morvan et al. | 370/329 |
| 7,321,928 B2 * | 1/2008 | Feltin et al. | 709/223 |
| 7,849,150 B2 | 12/2010 | Loeebbert et al. | |
| 2003/0126199 A1 * | 7/2003 | Kadri et al. | 709/203 |
| 2003/0126245 A1 * | 7/2003 | Feltin et al. | 709/223 |
| 2003/0147386 A1 | 8/2003 | Zhang et al. | |
| 2003/0195019 A1 | 10/2003 | Litwin | |
| 2005/0086273 A1 | 4/2005 | Loebbert et al. | |
| 2006/0161670 A1 * | 7/2006 | Andersen et al. | 709/230 |
| 2007/0087756 A1 * | 4/2007 | Hoffberg | 455/450 |
| 2007/0099702 A1 * | 5/2007 | Tupper | 463/42 |
| 2007/0104123 A1 | 5/2007 | Tomici et al. | |
| 2007/0198675 A1 * | 8/2007 | Amanuddin et al. | 709/223 |
| 2008/0049619 A1 * | 2/2008 | Twiss | 370/236 |
| 2008/0133727 A1 * | 6/2008 | Belqasmi et al. | 709/223 |
| 2008/0165785 A1 * | 7/2008 | Baker et al. | 370/395.2 |

(Continued)

FOREIGN PATENT DOCUMENTS

| | | |
|---|---|---|
| JP | 2005-523666 A | 8/2005 |
| KR | 10-2004-0101050 A | 12/2004 |
| KR | 10-2005-0063750 A | 6/2005 |

OTHER PUBLICATIONS

Communication dated Dec. 18, 2013, issued by the Korean Intellectual Property Office in counterpart Korean Patent Application No. 10-2007-0120412.

*Primary Examiner* — Hamza Algibhah
(74) *Attorney, Agent, or Firm* — Sughrue Mion, PLLC (57) ABSTRACT

An apparatus and method for setting a role based on capability of a terminal are provided. The apparatus includes a calculation unit calculating a capability value of the terminal to check whether the role set in a pertinent terminal is suitable, a determination unit determining whether the role set on the pertinent terminal is suitable based on the calculated capability value, and a setting unit changing and managing information for setting the role set in the pertinent terminal.

17 Claims, 6 Drawing Sheets

(56) References Cited

U.S. PATENT DOCUMENTS

| | | | |
|---|---|---|---|
| 2008/0208976 A1* | 8/2008 | Chapalamadugu et al. | 709/205 |
| 2008/0256563 A1* | 10/2008 | Han | 719/329 |
| 2008/0288580 A1* | 11/2008 | Wang et al. | 709/203 |
| 2009/0089363 A1* | 4/2009 | Keohane et al. | 709/203 |
| 2009/0106364 A1* | 4/2009 | Rissanen | 709/205 |
| 2009/0111506 A1* | 4/2009 | Laroia et al. | 455/550.1 |
| 2009/0222450 A1* | 9/2009 | Zigelman | 707/10 |
| 2009/0234917 A1* | 9/2009 | Despotovic et al. | 709/204 |
| 2009/0300672 A1* | 12/2009 | Van Gulik | 725/31 |

* cited by examiner

LEAF TERMINAL → SUPER TERMINAL

FIG. 4B

SUPER TERMINAL → LEAF TERMINAL

FIG. 5

APPARATUS AND METHOD FOR SETTING ROLE BASED ON CAPABILITY OF TERMINAL

CROSS-REFERENCE TO RELATED APPLICATION

This application claims priority from Korean Patent Application No. 10-2007-0120412 filed on Nov. 23, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to setting a role based on the capability of a terminal, and, more particularly, to an apparatus and a method of calculating a capability value according to a change in the capability of each terminal and changing a role of the terminal based on the calculated capability value of the terminal.

2. Description of the Related Art

A conventional algorithm, i.e., peer-to-peer (P2P), that is an application level protocol, such as hyper text transfer protocol (HTTP), supports real time communications, resource distribution, resource exchange, and others between computer users. P2P networks can be classified into hybrid P2P networks using a server, and pure P2P networks where every node serves as a server and a client. Pure P2P networks that are based on the fundamental concept of P2P cannot search for and find resources shared by nodes in a large-scale network. A hybrid P2P network shares resources with each of a plurality of nodes through the server, and comprises a central server providing services and P2P nodes having substantial sharing resources. The central server maintains a network connection session with each of the nodes, manages metadata for sharing resources, and easily searches for resources required by the P2P nodes. Each of the P2P nodes accesses the server to search for a node that holds resources in order to search for the sharing resources. A resource is actually exchanged between two connected nodes. Napster was one of the first widely used hybrid P2P networks. However, a hybrid P2P network has limited extensibility, is more costly, and is not stable due to centralization.

Examples of widely used pure P2P networks are Gnutella and Freenet. Gnutella forms a network by connecting each of a plurality of nodes in terms of applications. Each of the nodes floods a search message into a predetermined range to search for a file and obtains information of a node that holds the file. However, since each of the nodes floods a search message periodically into the Gnutella network, the pure P2P network has limited extensibility.

Meanwhile, a P2P overlay network that is constructed by the combination of an actual value and a key obtained from a hash function using a hash table provides extensibility and stability. Chord, Pastry, and CAN are protocols for P2P overlay networks based on a distributed hash table (DHT).

Chord uses an m-bit virtual identification space to assign nodes and sharing files in identification values obtained from a hash function. Also, each of the nodes maintains a routing table called a finger table to easily search for resources.

Microsoft's Pastry assigns uniformly distributed node identifications randomly from a circular 128-bit identification space through an encoding hash. Given a 128-bit key, Pastry routes an associated message toward a live node whose node identification is numerically closest to the key. Each node keeps track of its neighbor set and notifies applications of changes in the set.

CAN obtains a vector P (p=hash (key)) corresponding to a point in a d-dimensional space through the hash function. Each of the nodes stores data corresponding to a zone divided from a virtual space.

In addition, most structural P2P systems have planar structures and peers participating in the P2P systems perform the same role.

Recently, focusing on the fact that terminals participating in the overlay network system based on the DHT have different capabilities, various methods of allowing terminals to perform different roles based on terminal capability have been proposed, and peers are classified as supernodes and leaf nodes according to their roles. However, since the fact that node capability may change has not been taken into consideration, a supernode role assigned in the first place may turn out to be unsuitable later. Meanwhile, in the case where a leaf node role was assigned to a terminal in the first place and the capability of the terminal was increased later, the terminal could not fully utilize its capability due to the first assigned role as a leaf node. Therefore, the overall performance of the P2P system may be lowered.

Korean Published Patent Application No. 2004-0101050 (Method for Allocating Identifier Peer Group in Peer-to-Peer Network) discloses a technology for defining suitable parameters and an algorithm for automatically determining an identifier for a peer group while minimizing an amount of data traffic required for distributing new identifiers, the technology being used when the most suitable existing group identifier is determined and reused, or when the structure of an OwnerZone changes by adding or removing peers, and a new OwnerZone is generated by dividing or merging Owner-Zones. In the disclosed invention, however, no teaching about technology for changing the role performed by a terminal based on the terminal capability is described.

SUMMARY OF THE INVENTION

The present invention provides an apparatus and method for performing a role of a terminal based on capability of the terminal by checking a change in the terminal capability.

The above and other objects of the present invention will be described in or be apparent from the following description of the exemplary embodiments.

According to an aspect of the present invention, there is provided an apparatus for setting a role based on the capability of a terminal, the apparatus including a calculation unit calculating a capability value of the terminal to check whether the role set on a pertinent terminal is suitable, a determination unit determining whether the role set in the pertinent terminal is suitable based on the calculated capability value, and a setting unit changing and managing information for setting the role set in the pertinent terminal.

According to another aspect of the present invention, there is provided a method of setting a role based on capability of a terminal, the method including calculating a capability value of the terminal to check whether a role set in a pertinent terminal is suitable, determining whether the role set in the pertinent terminal is suitable based on the calculated capability value, and changing information for setting the role set in the pertinent terminal.

In another aspect of the present invention, there is provided a method of providing content, which includes receiving one or more sets of content; creating one or more threads that are given to the content to process a work; and providing a frame per thread and creating an image page for playing the content on a web browser.

BRIEF DESCRIPTION OF THE DRAWINGS

The above and other features and advantages of the present invention will become apparent by describing in detail exemplary embodiments thereof with reference to the attached drawings in which.

DETAILED DESCRIPTION OF THE INVENTION

Aspects and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings.

Focusing on the fact that terminals participating in the overlay network system based on the DHT have different capabilities, various methods of allowing terminals to perform different roles based on the terminal capability have been proposed, and peers are classified as supernodes and leaf nodes according to their roles. Here, a supernode, which is superior to a leaf node in capability, manages leaf nodes on a predetermined key space.

In addition, the supernode stores references of leaf nodes under its management. That is, when each leaf node publishes its own reference, the reference is stored in the supernode having a key value closest to that of the reference. Here, the reference refers to data published on the DHT by each node or metadata for the published data.

In addition, a leaf node, which is inferior to a supernode in capability, depends upon the supernode. That is, when a leaf node receives a request for Publish or Lookup service for a reference corresponding to its own key space, the leaf node transmits the request to a supernode to allow the supernode to deal with the request.

Figure 1:
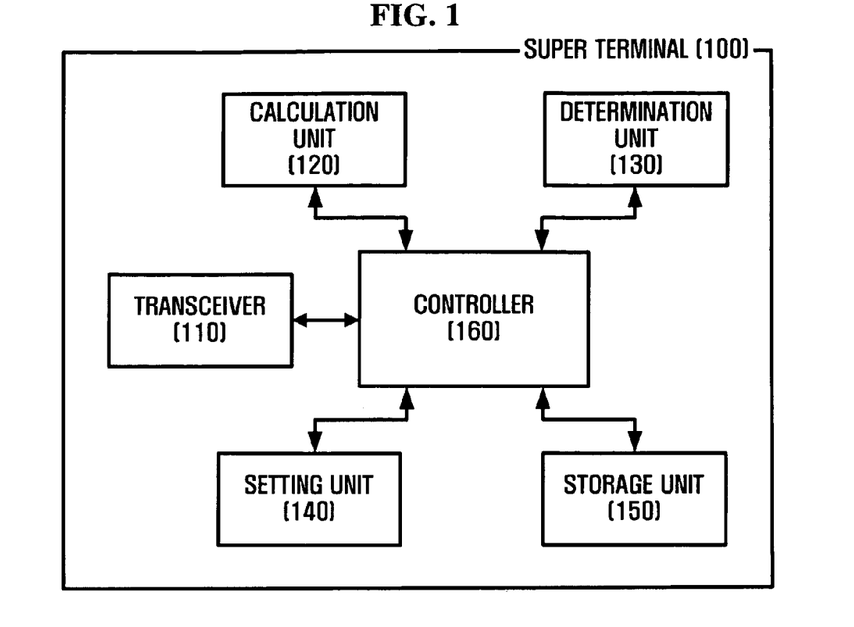
FIG. 1 is a block diagram of a terminal performing a supernode role in an apparatus for setting a role based on terminal capability according to an embodiment of the present invention.

FIG. 1 is a block diagram of a terminal performing a supernode role in an apparatus for setting a role based on terminal capability according to an embodiment of the present invention.

As shown in FIG. 1, a terminal performing a supernode role 100 (e.g., "super terminal") includes a transceiver 110, a calculation unit 120, a determination unit 130, a setting unit 140, a storage unit 150, and a controller 160.

The term "unit" used herein means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and modules or further separated into additional components and units.

The transceiver 110 receives the request for Publish or Lookup service from a terminal performing a leaf node role and the reference, and, when the super terminal 100 changes its role into a leaf node role, transmits a pre-stored reference to a next super terminal.

The calculation unit 120 calculates a capability value to check whether a role set on a pertinent terminal is suitable. Here, the capability value is determined according to network performance, such as a bandwidth, a transmission rate, or a delay time, battery remainder, usability of required resources (e.g., memory or CPU), and so on. In addition, when calculating the capability value, weights for various parameters can be adjusted. A formula for calculating the capability value is:

$$C = w_n N + w_b B + w_r R, \quad (1)$$

where C denotes a capability value of each terminal, N denotes network capability, B denotes battery remainder, and R denotes usability of resource required. In addition, $w_n$, $w_b$, and $w_r$ denote weights of N, B, and R, respectively. In the present invention, the highest weight is assigned to network capability, i.e., N.

The determination unit 130 determines whether the role set in the terminal 100 is suitable based on the capability value obtained from the calculation unit 120. Here, when the calculated capability value of the terminal 100 is greater than a predetermined critical value, the determination unit 130 determines that the pertinent terminal is to continue to perform a supernode role. When the calculated capability value of the terminal 100 is smaller than the predetermined critical value, the determination unit 130 determines that the terminal 100 is to perform a leaf node role.

The setting unit 140 changes and manages information for setting the role set in the terminal 100 based on the determination made by the determination unit 130.

For example, if the determination unit 130 determines that the terminal 100 is to perform a leaf node role, the setting unit 140 changes the role of the terminal 100 into a leaf node role.

Figure 2:
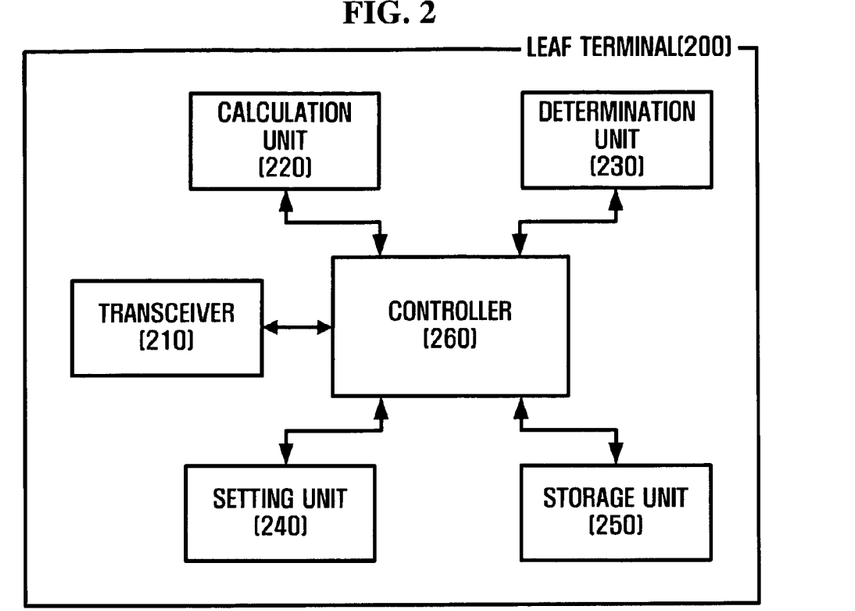
FIG. 2 is a block diagram of a terminal performing a leaf node role in the apparatus for setting a role based on terminal capability according to an embodiment of the present invention.

Conversely, if a terminal is a leaf node, i.e., leaf terminal, when the determination unit of the leaf node determines that the leaf terminal is to perform a role of a super node, the setting unit of the leaf node changes the role of the leaf terminal into a role of a super node (See FIG. 2).

The storage unit 150 stores the terminal capability value calculated by the calculation unit 120 and information about the role of the terminal 100 set by the setting unit 140.

In addition, the storage unit 150 stores references of the leaf nodes managed by the terminal 100, and information used in calculating capability values (e.g., network performance, battery remainder, usability of resource required (e.g., memory or CPU), and etc.

Based on based on information about the role set by the setting unit 140, if the terminal 100 is to perform a leaf node role, the controller 160 searches for a new super terminal and transmits information about the references of the terminals performing leaf node roles, i.e., the leaf terminals, and the information pre-stored in the storage unit 150, to the new super terminal using the transceiver 110.

Based on the information about the role set by the setting unit 140, if the terminal 100 is to perform a leaf node role, the controller 160 controls the terminal 100 to notify the leaf terminals under its management that the role has changed from a supernode role to a leaf node role.

The controller 160 also controls operation of various functional blocks 110 to 150 constituting the super terminal 100.

FIG. 2 is a block diagram of a terminal performing a leaf node role in the apparatus of setting a role based on terminal capability according to an embodiment of the present invention.

As shown in FIG. 2, a terminal 200 performing a leaf node role (e.g., 'leaf terminal') includes a transceiver 210, a calculation unit 220, a determination unit 230, a setting unit 240, a storage unit 250, and a controller 260. Here, the calculation unit 220, the determination unit 230 and the setting unit 240 are substantially the same as the calculation unit 120, the determination unit 130 and the setting unit 140 of the terminal 100 shown in FIG. 1.

The transceiver 210 transmits a request for a Publish or Lookup service and a reference of the terminal 200 to a super terminal, and when the role of the terminal 200 is changed and the terminal 200 performs a supernode role, receives references of leaf terminals managed by the super terminal, from the super terminal positioned next to the leaf terminal 200 on a key space.

The storage unit 250 stores a terminal capability value calculated by the calculation unit 220 and information about a role of the terminal 200 set by the setting unit 240.

In addition, the storage unit 250 stores and information used in calculating capability values (e.g., network performance, battery remainder, usability of resource required (e.g., memory or CPU), and etc.

Based on information about the role set by the setting unit 240, when the terminal 200 performs a supernode role, the controller 260 controls the terminal 200 to search for a super terminal positioned next to the terminal 200 on a key space and to make a request for references of leaf nodes managed by the super terminal, to the super terminal. Accordingly, the controller 260 controls the terminal 200 to act as a super terminal.

The controller 260 also controls operation of various functional blocks 210 to 250 constituting the terminal 200.

Figure 3:
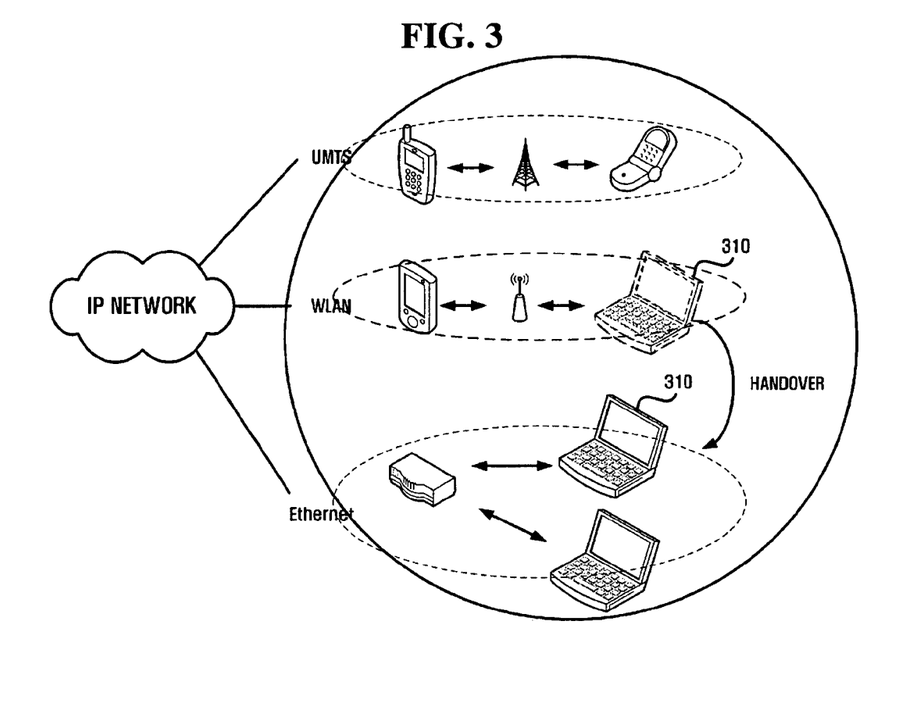
FIG. 3 illustrates examples of terminal capability and a change in the terminal capability in the apparatus for setting a role based on terminal capability according to an embodiment of the present invention.

FIG. 3 illustrates examples of terminal capability and a change in the terminal capability in the apparatus for setting a role based on terminal capability according to an embodiment of the present invention.

As shown in FIG. 3, the respective terminals can communicate with each other via an Ethernet, a wireless local area network (WLAN), a universal mobile telecommunications system (UMTS), or the like. When network performance such as a bandwidth or a data transmission rate is determined to be the primary capability of a terminal, terminals connected to each other via Ethernet exhibit the highest capability, terminals connected to each other via WLAN exhibit the intermediate capability, and terminals connected to each other via UMTS exhibit the lowest capability.

That is, the terminals connected to each other via Ethernet become the super terminals performing a supernode role, and the terminals connected to each other via WLAN or UMTS become the leaf terminals performing a leaf node role.

For example, if a predetermined terminal (i.e., a leaf terminal) 310 connected via WLAN to perform a leaf node role is handed over and moved to Ethernet, a new capability value of the predetermined terminal 310 is calculated based on network movement information of the predetermined terminal 310 and characteristic information about the moved network. As a calculation result, if the calculated capability value of the predetermined terminal 310 is greater than a predetermined critical value, the predetermined terminal 310 is changed into a super terminal performing a supernode role in place of a leaf node role.

Figure 4A:
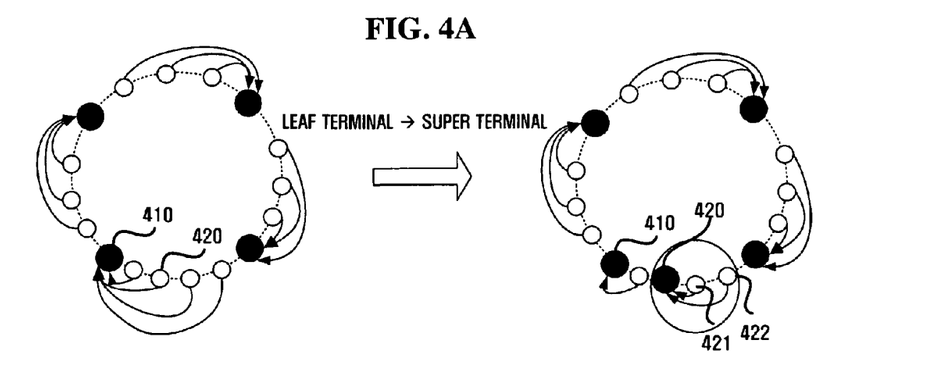
FIGS. 4A and 4B illustrates examples of terminals changing their roles in the apparatus for setting a role based on the terminal capability according to an embodiment of the present invention.
Figure 4B:
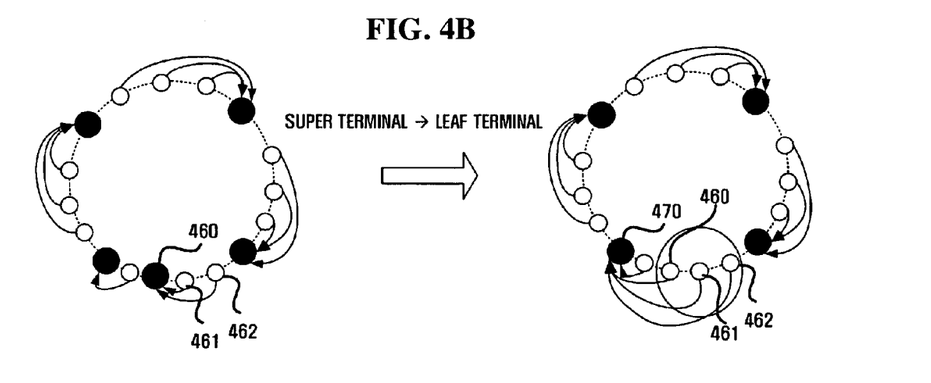

FIGS. 4A and 4B illustrates examples of terminals changing roles in the apparatus of setting a role based on terminal capability according to an embodiment of the present invention. While FIGS. 4A and 4B show exemplary hierarchical Chord ring structures, the invention can also be applied to other types of DHT protocols.

As shown in FIG. 4A, when a terminal 420 first assigned as a terminal performing a leaf node role is determined to be capable of performing a supernode role as a result of calculating a capability value of the terminal 420, the role of the terminal 420 is changed such that the terminal 420 may perform the supernode role.

Next, since the terminal 420 having performed the leaf node role, i.e., a leaf terminal, has become a terminal performing a supernode role, i.e., a super terminal, the terminal 420 (i.e., a new super terminal 420), should manage a constant portion of a DHT key space. Accordingly, the new super terminal 420 searches for a super terminal 410 positioned next to the super terminal 420 on the key space. Here, the new super terminal 420 manages a portion ranging from the key value managed by the next super terminal 410 to the key value managed by the new super terminal 420 itself.

Then, the new super terminal 420 receives references of leaf terminals 421 and 422, which are to be under its own management, from the next super terminal 410. The new super terminal 420 manages only some of the leaf terminals under the management of the next super terminal 410. A process of changing node roles from a leaf terminal into a super terminal will later be described in greater detail with reference to FIG. 5.

As shown in FIG. 4B, when a terminal 460 previously assigned as a terminal performing a supernode role, i.e., as a super terminal 460, in the first place is determined to be incapable of performing the supernode role as a result of calculating a capability value of the super terminal 460, the role of the super terminal 460 is changed such that the super terminal 460 may perform a leaf node role.

That is, the super terminal 460 having performed the supernode role, has changed into a leaf terminal 460 performing a leaf node role. In order to transmit references of leaf terminals managed by the super terminal 460, it is necessary to search for a new closest super terminal 470 to manage the key values managed by the super terminal 460.

Next, the super terminal 460 transmits all the references under its management to the new super terminal 470. Here, the terminal 460 having changed into a terminal performing a leaf node role sets the super terminal 470 as its own super terminal.

In addition, the super terminal 460 having changed into a leaf terminal notifies leaf terminals 461 and 462 under its management that the super terminal 460 has become a leaf terminal. A process of changing node roles from a super terminal into a leaf terminal will be described later in greater detail with reference to FIG. 6.

Figure 5:
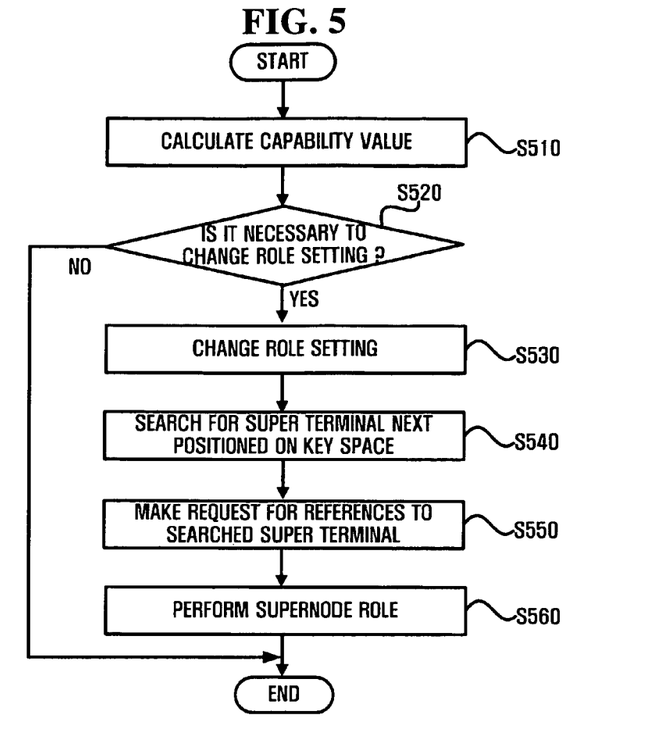
FIG. 5 illustrates a process of a terminal performing a leaf node role being changed into a terminal performing a supernode node role in a method of setting a role based on terminal capability according to an embodiment of the present invention.

FIG. 5 illustrates a process of a terminal performing a leaf node role being changed into a terminal performing a super-node node role in a method of setting a role based on terminal capability according to an embodiment of the present invention.

First, in order to check whether a role set in a leaf terminal is suitable, a capability value of the leaf terminal is calculated (S510). Here, the capability value of the leaf terminal is determined according to network performance, such as a bandwidth, a transmission rate, or a delay time, battery remainder, usability of resource required (e.g., memory or CPU), and so on. In addition, when calculating the capability value, weights for various parameters can be adjusted. A formula for calculating the capability value is given above.

It is determined whether the role set in the leaf terminal is suitable based on the capability value obtained in S510 (S520). Here, when the calculated capability value of the leaf terminal is greater than a predetermined critical value, it is determined that the leaf terminal will perform a supernode role. When the calculated capability value of the leaf terminal is smaller than the predetermined critical value, it is determined that the leaf terminal will continue to perform a leaf node role.

Since calculated capability value is greater than a predetermined critical value, that is, as a determination result, if it is necessary to change the role of the leaf terminal (YES in S520), information for setting the role set on the pertinent leaf terminal is changed based on the determination result made in S520 (S530).

Based on the information for setting the role, a super terminal positioned next to the leaf terminal on the key space is searched for so that the leaf terminal can perform a supernode role (S540).

Next, a request for references of leaf terminals is made to and received from the next super terminal, the leaf terminals having been managed by the next super terminal (S550).

The references of the leaf terminals to be managed by the former leaf node now newly performing a super node role, are stored and the super node role is performed (S560).

Meanwhile, as a determination result, if it is not necessary to change node roles (NO in S520), role set on the leaf terminal is not changed. Thereafter, the capability value is calculated at predetermined time intervals, and based on the calculated capability value, it is determined whether the role set in a pertinent leaf terminal is suitable.

Figure 6:
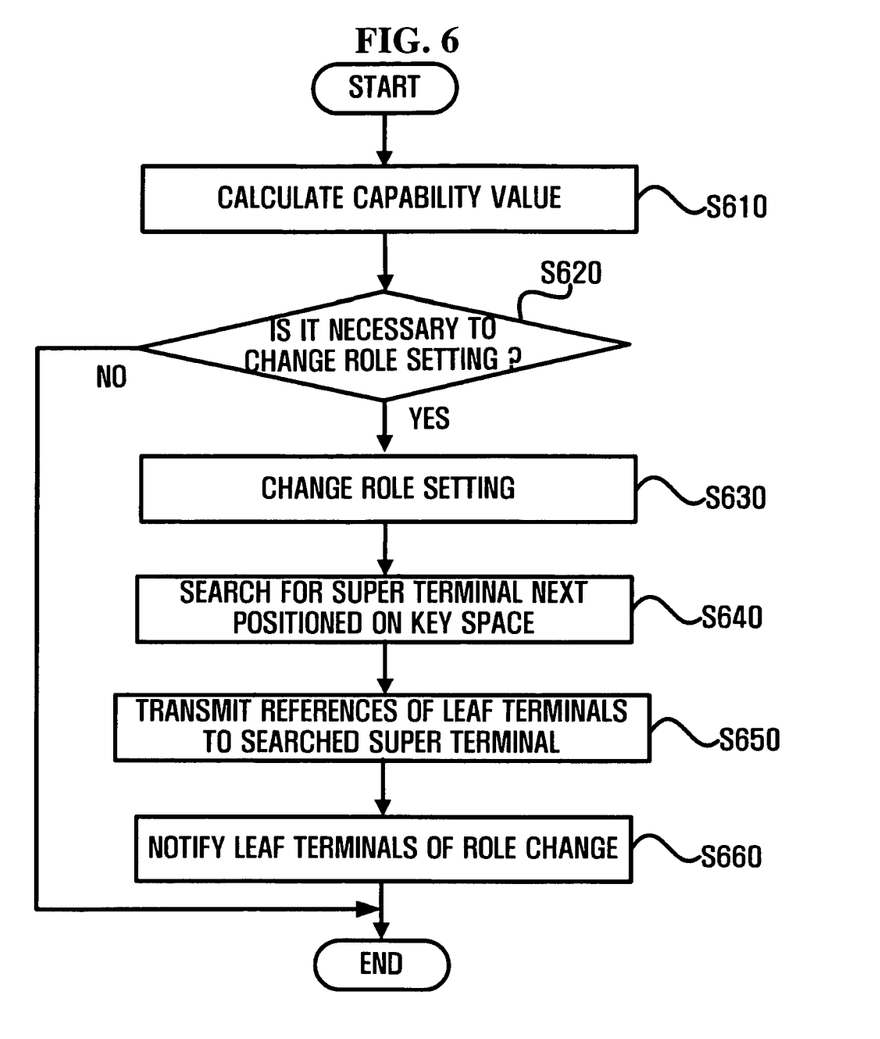
FIG. 6 illustrates a process of a terminal performing a supernode node role being changed into a terminal performing a leaf node role in a method of setting a role based on terminal capability according to an embodiment of the present invention.

FIG. 6 illustrates a process of a terminal performing a supernode role being changed into a terminal performing a role of a leaf node in a method of setting a role based on terminal capability according to an embodiment of the present invention.

First, in order to check whether a role set on a super terminal is suitable or not, a capability value of the super terminal is calculated (S610). Here, the capability value is determined according to network performance, such as a bandwidth, a transmission rate, or a delay time, battery remainder, usability of resource required (e.g., memory or CPU), and so on. In addition, when calculating the capability value, weights for various parameters can be adjusted. A formula for calculating the capability value is given above.

It is determined whether the role set in the super terminal is suitable based on the capability value obtained in S610 (S620). Here, when the calculated capability value of the super terminal is greater than a predetermined critical value, it is determined for the super terminal to continue to perform a supernode role. When the calculated capability value of the super terminal is smaller than the predetermined critical value, it is determined for the super terminal to perform a leaf node role.

Since calculated capability value is less than a predetermined critical value, that is, as a determination result, if it is necessary to change the role of the super terminal (YES in S620), information for setting the role set in the super terminal is changed based on the determination result made in S620 (S630).

Based on the information for setting the role, a super terminal positioned next to the super terminal on the key space is searched for so that the super terminal can perform a leaf node role (S640).

Then, references of leaf terminals are transmitted to the next super terminal (S650), and the next super terminal is set as its own super terminal.

The leaf terminals are notified that the super terminal that had managed them has become a leaf terminal (S660).

As described above, the apparatus and method for setting a role based on capability of a terminal according to the present invention provide at least the following aspects.

First, a role of a terminal can be performed according to changed capability of each terminal by checking a change in the capability of each terminal.

In addition, since each terminal performs a role suitable to its own capability, the efficiency of the peer-to-peer (P2P) system can be maximized.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. An apparatus for determining whether a set role of a terminal in a network is suitable based on a capability of the terminal, comprising:
   a calculation unit which calculates a capability value of the terminal;
   a determination unit which determines, without considering capabilities and roles of other terminals of the network, whether the set role of the terminal, which is previously set, is suitable based on the calculated capability value; and
   a setting unit which manages information regarding the set role in the terminal,
   wherein at least one of the calculation unit, the determination unit, and the setting unit is implemented as a hardware component,
   wherein the previously set role of the terminal is previously set in the terminal, wherein when the determination unit determines that the set role of the terminal is not suitable based on the calculated capability value, the terminal determines, without considering capabilities and roles of other terminals of the network, to change the set role, and wherein the apparatus is a super terminal or a leaf terminal.

2. The apparatus of claim 1, wherein information used in calculating the capability value comprises network performance, remaining battery power, and usability of resource.

3. The apparatus of claim 1 further comprising a controller which controls the terminal to have a supernode role or a leaf node role based on the information regarding the set role managed by the setting unit.

4. The apparatus of claim 3, wherein the terminal is a first terminal and if the set role in the first terminal is changed from a supernode into a leaf node, the controller searches for a second terminal, and transmits reference information for a leaf terminal stored in the first terminal, to the second terminal.

5. The apparatus of claim 3, wherein the terminal is a first terminal and if the set role in the first terminal is changed from a leaf node into a supernode, the controller searches for a second terminal positioned next to the first terminal on a key space, and makes a request for reference information of a leaf terminal to the second terminal next to the first terminal.

6. A method of determining whether a set role of a terminal in a network is suitable based on capability of the terminal, by a super terminal or a leaf terminal, comprising:

calculating, by an apparatus for setting the role, a capability value of the terminal;

determining, by the apparatus for setting the role, without considering capabilities and roles of other terminals of the network, whether the set role set of the terminal, which is previously set, is suitable based on the calculated capability value; and managing, by the apparatus for setting the role, information regarding the set role in the terminal, wherein the previously set role of the terminal is previously set in the terminal, and wherein when the determining determines that the set role of the terminal is not suitable based on the calculated capability value, the terminal determines, without considering the capabilities and the roles of other terminals of the network, to change the set role.

7. The method of claim 6, wherein information used in the calculating the capability value includes network performance, remaining battery power, and usability of resource.

8. The method of claim 6, further comprising performing a supernode role or a leaf node role based on the information regarding the set role of the terminal.

9. The method of claim 8, wherein the terminal is a first terminal and the method of claim 8 further comprises, if the set role of the first terminal is changed from a supernode into a leaf node, searching for a second terminal; and transmitting reference information for a leaf terminal stored in the first terminal, to the second terminal.

10. The method of claim 8, wherein the terminal is a first terminal and the method of claim 8 further comprises, if the set role of the first terminal is changed from a leaf node into a supernode, searching for a second terminal positioned next to the first terminal on a key space; and making a request for reference information of a leaf terminal to the second terminal next to the first terminal.

11. The apparatus of claim 4, wherein the second terminal is a next super terminal.

12. The apparatus of claim 5, wherein the second terminal is a super terminal.

13. The method of claim 9, wherein the second terminal is a next super terminal.

14. The method of claim 10, wherein the second terminal is a super terminal.

15. The apparatus of claim 3, wherein the terminal is a first terminal and if the set role in the first terminal is changed from a supernode into a leaf node, the controller searches for a second supernode terminal positioned next to the first terminal on a key space, and transmits reference information, stored in the first terminal, for a leaf terminal between the first terminal and the second supernode terminal on the key space, to the second supernode terminal.

16. The apparatus of claim 3, wherein the terminal is a first terminal and if the set role in the first terminal is changed from a leaf node into a supernode, the controller searches for a second supernode terminal positioned next to the first terminal on a key space, and makes a request to the second supernode terminal for reference information of a leaf terminal between the first terminal and the second supernode terminal on the key space.

17. The method of claim 6, wherein each terminal of the network determines, without considering capabilities and roles of other terminals of the network, its own set role.

* * * * *